United States Patent [19]
Jimenez-Laguna

[11] Patent Number: 5,997,936
[45] Date of Patent: Dec. 7, 1999

[54] BEVERAGE TOPPING

[75] Inventor: Antonio Jimenez-Laguna, Lausanne, Switzerland

[73] Assignee: Nestec S.A., Vevey, Switzerland

[21] Appl. No.: 09/188,482

[22] Filed: Nov. 9, 1998

[30] Foreign Application Priority Data

Nov. 11, 1997 [EP] European Pat. Off. ............. 97203469

[51] Int. Cl.⁶ ............................... A23G 9/02; A23G 9/04; A23F 5/36

[52] U.S. Cl. ..................... 426/565; 426/569; 426/570; 426/594; 426/130; 426/316; 426/317

[58] Field of Search ..................................... 426/565, 569, 426/570, 590, 593, 594, 118, 130, 106, 316, 317, 474, 587, 584

[56] References Cited

U.S. PATENT DOCUMENTS

| | | |
|---|---|---|
| 3,492,126 | 1/1970 | Rubenstein et al. .................... 99/71 |
| 4,039,693 | 8/1977 | Adams et al. ........................ 426/565 |
| 4,451,492 | 5/1984 | Dell et al. ............................ 426/564 |
| 4,542,035 | 9/1985 | Huang et al. ......................... 426/565 |
| 4,746,527 | 5/1988 | Kuypers ............................... 426/569 |
| 5,384,146 | 1/1995 | Gonsalves et al. ..................... 426/565 |
| 5,520,946 | 5/1996 | Chablaix et al. ...................... 426/570 |
| 5,780,092 | 7/1998 | Agbo et al. ............................ 426/569 |

FOREIGN PATENT DOCUMENTS

| | | |
|---|---|---|
| 433 847 | 3/1973 | Australia . |
| 2163284 | 5/1996 | Canada . |
| 0 713 650 | 5/1996 | European Pat. Off. . |
| 2 275 155 | 1/1976 | France . |

*Primary Examiner*—Keith Hendricks
*Attorney, Agent, or Firm*—Pennie & Edmonds LLP

[57] ABSTRACT

The invention relates to a method for preparing a hot beverage having foamed milk-based topping. A frozen concentrated and aerated milk is combined with a liquid to form the beverage. The invention also relates to a product comprising a flavored beverage base and frozen milk concentrates constituting distinct separate portions of the product. The frozen milk incorporates gas, so that the product provides a flavored beverage having a foamed milk topping upon addition of a liquid.

20 Claims, 2 Drawing Sheets

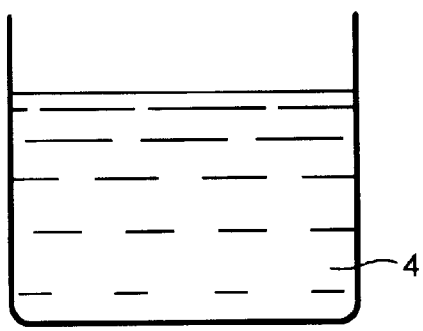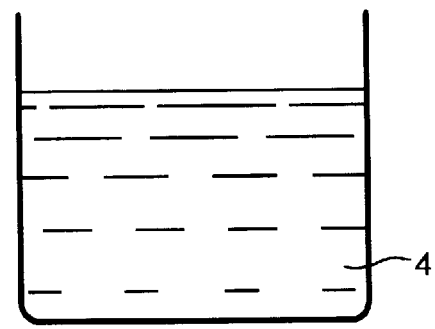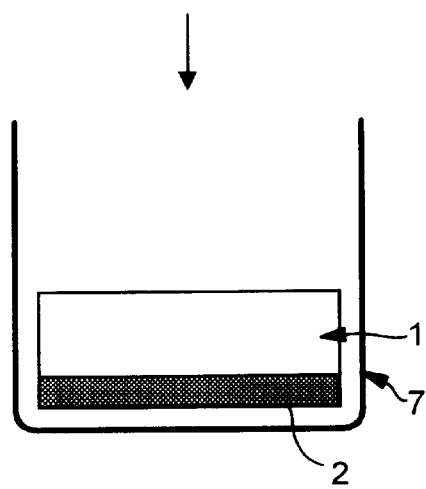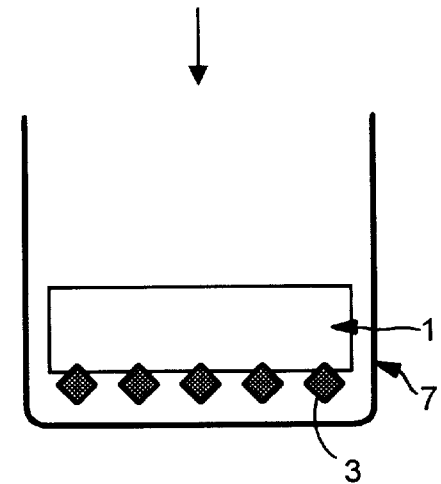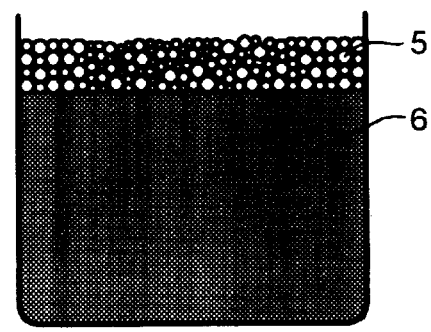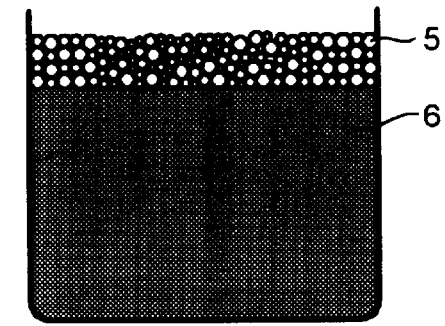
FIG. 1         FIG. 2

BEVERAGE TOPPING

TECHNICAL FIELD

The present invention relates to the making of a hot aerated or foamed liquid product or beverage. In particular, the invention includes a process for making a foamed topping for a hot beverage, more particularly for making a Cappuccino-style coffee beverage, and to the resulting products.

BACKGROUND ART

Conventional instant hot Cappuccino dry-mix compositions are based on powder components such as dried coffee solids, dried milk solids with added flavors, stabilizers, and sweeteners. These coffee and milk concentrates are usually in a granular or particulate form incorporating a gas. The addition of boiling water or hot milk to these concentrates results in an instant beverage with a foam topping. The formation of a foamed phase above the coffee/milk liquid is due to physical or chemical means of gas incorporation into the milk solids. Cappuccino compositions of the above-discussed types are described in European Patent Application 01 54 192 and PCT Patent Application WO96/08153.

It has been found that the incorporation of gas into the powder can change the density of the powder making it more fragile. The amount of gas incorporated may thus be limited by limitations on the density of the powder. Furthermore, for some powder compositions, a high foam volume in the final beverage may be difficult to achieve.

SUMMARY OF THE INVENTION

The invention relates to a method of preparing a beverage having foamed milk-based topping which comprises preparing a frozen concentrated milk having an overrun of at least 150%, and combining a liquid with the frozen concentrated milk to form the beverage. A beverage-forming component, such as a flavored beverage base, can be present separately or be added in the liquid in order to form the beverage. The preferred beverage-forming components include coffee, cocoa, or chocolate-based components, or mixtures thereof. These components can be in dry powder or liquid form.

Advantageously, the frozen concentrated milk is associated with a beverage-forming component before adding the liquid thereto. One way to do this is to form layers of the components as a separate product. A preferred product is formed by co-extruding the beverage-forming component and frozen concentrated milk. Thereafter, the product simply needs to be combined with a liquid to form the beverage.

Often, a hot beverage is desired. To obtain this, the liquid may be heated to a temperature of at least about 40° C. before the beverage is formed. Alternatively, the beverage may be heated after the liquid is added. Typical liquids include water, milk or mixtures thereof.

The invention also relates to a product comprising a beverage-forming component and a frozen milk concentrate component, wherein the frozen milk concentrate component incorporates a gas therein at an overrun of at least 150%, with the components constituting distinct separate portions of the product and being present in amounts sufficient to form a beverage having a foamed milk topping thereon after addition of a liquid to the product and melting of the frozen milk concentrate component. Preferred beverage-forming components include cocoa or coffee with the coffee being in the form of soluble coffee or a frozen coffee liquor. The distinct components are generally present in layers. If desired, a handle can be used for supporting the beverage-forming component and milk concentrate.

Another embodiment of then invention relates to a package comprising the beverage-forming component and frozen milk concentrate component. As above, the frozen milk concentrate component incorporates a gas at an overrun of at least 150%, and the components being present in amounts sufficient to form a beverage having a foamed milk topping thereon after addition of a liquid thereto and melting of the frozen milk concentrate component.

The package typically includes a first compartment for the beverage-forming component and a second compartment for the frozen milk concentrate component. Preferably, this package is in the form of a cup wherein the beverage-forming component and frozen milk concentrate component are present in amounts sufficient for one serving, with the cup being adapted to receive and retain liquid for forming the beverage.

BRIEF DESCRIPTION OF THE DRAWINGS

The invention will now be further described with reference to the drawings, in which FIGS. 1A, 1B and 1C are illustrations of the making of Cappuccino on the basis of frozen concentrated milk and frozen coffee liquor components, FIGS. 2A, 2B and 2C are illustrations of the making of Cappuccino on the basis of frozen concentrated milk and soluble coffee components, FIG. 4 is a cross-sectional view of the co-extruded coffee liquor and aerated frozen concentrated milk product shown in FIG. 3B.

DETAILED DESCRIPTION OF THE PREFERRED EMBODIMENTS

Figure 3:
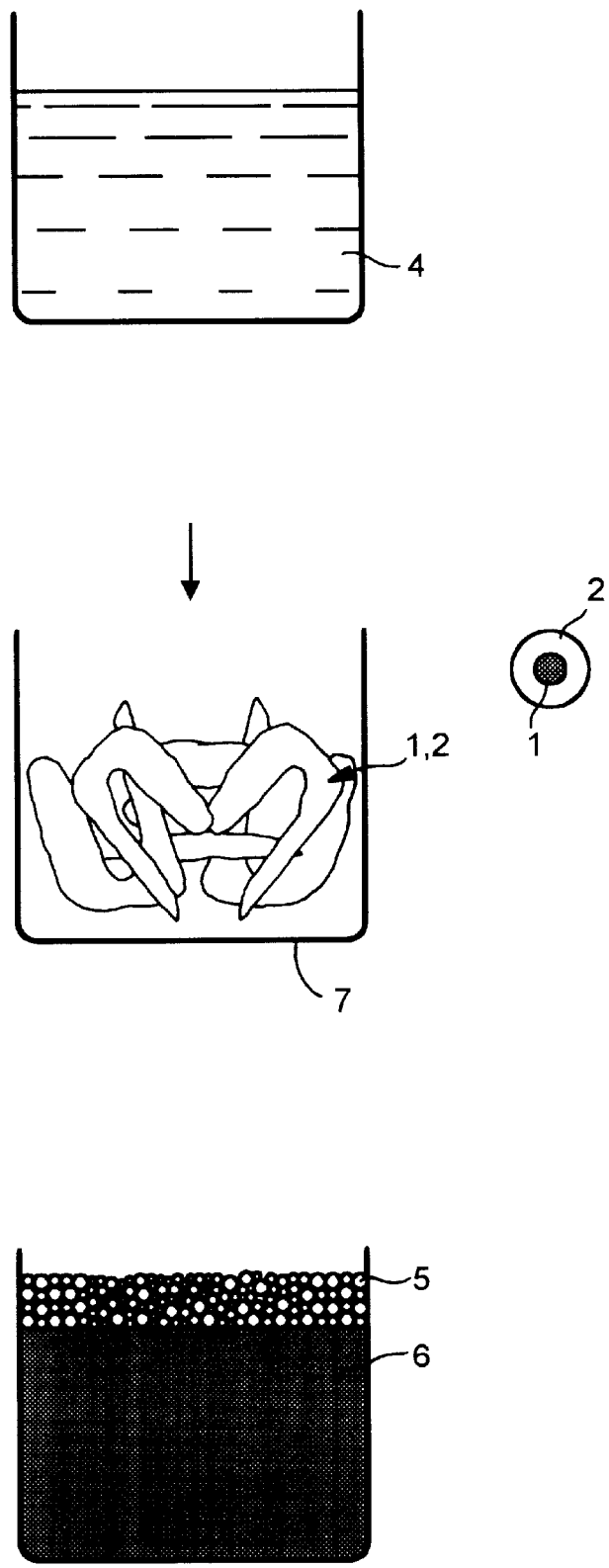
FIGS. 3A, 3B and 3C are illustrations of the making of a coffee beverage from co-extruded coffee liquor and aerated frozen concentrated milk components.

The present invention aims at providing a hot beverage such as a Cappuccino product that has the following characteristics:

1) Improved foaming properties.
2) Taste, texture and appearance close to authentic Italian Cappuccino.
3) Improved coffee taste in the liquid portion and improved coffee-to-milk flavor balance in the whole beverage preparation.

Accordingly, in a first embodiment, the invention relates to a method of use of frozen concentrated milk having an overrun of at least 150% for preparing a hot beverage having foamed milk-based topping on the addition of a liquid.

It has surprisingly been found that upon the addition of a liquid a foamed milk-based product may be formed on the top of a hot beverage. The liquid may be added cold and then heated with the topping or it may be hot or boiling when it is added to the frozen concentrated milk. If the beverage needs to be heated, this may conveniently be done in a microwave oven or by other means of providing heat into the product.

The invention is particularly suitable for the preparation of a beverage with a milk topping, the beverage being formed from a beverage-forming component selected from the group consisting of a coffee, cocoa, or chocolate-based component or mixtures thereof.

According to the invention, an improved milk aroma/flavor in the foam phase may be obtained compared with dried foamable products as the frozen milk concentrate is made without a drying step. In addition, it is believed that the functional properties of the milk ingredients may also be improved. It has been found that the invention may provide a balance of taste and aroma which is close to that of an original formula of authentic Italian Cappuccino. This is believed to be due to the use of milk solids which subjected to much less processing than dried powder ingredients. Milk solids are generally not processed except for an initial heat-treatment for pasteurization and possibly one concentration step.

In addition, the present invention should avoid the problem related to the formation of lumps during reconstitution of dried-coffee mixes with incorrectly tempered (e.g., boiling) water. It has furthermore been found that the milk proteins in frozen form should be better protected against heat than dried products, and that the pH induces flocculation when the milk proteins are reconstituted simultaneously with coffee solids.

Suitable liquids for forming the beverage include water, milk or mixtures thereof. Liquid products based on coffee, tea, cocoa, chocolate, or mixtures thereof can also be used. In a preferred embodiment of the invention, the frozen concentrated milk component is used together with a flavored beverage base, such as instant coffee, cocoa, chocolate, etc. If these beverage bases are used in connection with the frozen milk concentrate, the consumer simply needs to add water or milk and do the necessary heating in order to obtain a hot flavored beverage with a foamed milk topping. The invention allows the liquid part and the foamed topping to be reconstituted as two distinct phases or, if desired, as a homogeneous composition if sufficient mixing is applied.

The milk used for the frozen concentrated milk is conveniently pasteurized milk such as whole or skimmed milk. The milk is advantageously pasteurized whole milk. The expression "milk" also covers products derived from milk such as liquid creams. An example of a liquid cream is half-cream that contains about 15% fat.

Pasteurized whole or skimmed milk is concentrated by conventional evaporation or any other technological means of concentration, including freeze-concentration, reverse osmosis, ultra-filtration, etc. After concentration, the total content of milk solids is suitably from 10 to 50%, and preferably greater than about 20%.

The concentrate is then frozen. Conventional ice-cream freezers may be used. Advantageously, however, the freezing may take place in an extruder, preferably a twin-screw extruder. In the extruder, the pressures and flow rates in extrusion die can be adjusted such that the milk portion of the product is aerated to over 200% overrun. The flow rates of the supply of the milk and coffee solids are regulated to produce different combinations and formulations of milk and coffee frozen solids. It may be advantageous that the milk concentrate is pre-aerated before entering the twin-screw freezer/extruder. Freezing in an extruder is described in co-pending PCT patent application WO97/43904, the content of which is expressly incorporated herein by reference.

This PCT patent application describes a cold extrusion technology by which evaporated or concentrated milk solids are frozen and aerated in a manner such that a phase-stable milk drink is obtained upon by addition of water to the solids or as they melt to room temperature. Twin-screw freezing technology enables continuous mixing, aeration and freezing of milk solids. Furthermore, it allows a flexible manner of gas incorporation and can give a better control of foam texture and volume in the final beverage preparation.

In a manner as described above, a coffee extract is concentrated by conventional evaporative means. A suitable concentrate has a total solids content of 15 to 70% by weight, and preferably from about 40 to 70%. Additional aromatization of the coffee extract is also possible, if desired.

In a preferred embodiment of the invention, the concentrated milk forms part of a topping base and constitutes at least 90% and preferably above 95% by weight of the non-aerated topping base (i.e., of the solid components of the topping base). In a particularly favorable embodiment of the invention, 97 to 99% by weight of the topping base is concentrated milk. The topping base is aerated and frozen to form a frozen topping material. The high percentages of concentrated milk in the topping material provide a clear and distinct milk flavor to the topping when reconstituted.

Overrun is defined as the volume percentage of a gas, usually air, in relation to the gas-free constituents of the volume. An overrun may result from whipping action or aggregation. In this invention, the milk can be aerated with a gas selected from the group consisting of oxygen, nitrogen, carbon dioxide, air and other mixtures thereof.

The overrun of the frozen concentrated milk may be in the range of from about 130 to 250%, preferably above 150%, and more preferably at least 170%. Advantageously, an overrun of from about 200 to 250% is desirable. The level of overrun can be chosen depending on the how airy or light one wishes the topping to be. Higher overruns result in a higher, lighter and more aerated topping. With an overrun of about 130%, the topping will generate a thin layer of foam on the beverage.

In the present context, "hot" means at least about 40° C. It is preferred to provide a beverage temperature of above about 50° C., and more preferably in the range of 55 to 65° C. The beverage is conveniently heated by electromagnetic heating, such as microwave heating either in a conventional oven or on a hot plate. Generally, the beverage is heated to the desired temperature and the topping is completely melted. Of course, the desired temperature of the beverage and topping can be selected according to the preferences of the consumer.

If very hot or boiling water is used to form the beverage, there may no need for additional heating. In this embodiment, the beverage will usually be in a temperature range of 45 to 50° C. to as high as 55° C. If desired, the beverage could even be consumed before the topping is totally melted. At that point, the beverage will be hot while the topping will be relatively cool.

In another embodiment, the invention relates to a product comprising a flavored beverage base and frozen milk concentrates constituting distinct separate portions of the product. In this embodiment, the frozen milk incorporates gas at an overrun of at least 150% so that the product provides a flavored beverage having a foamed milk topping after addition of a liquid and subsequent melting of the frozen milk.

A suitable flavored beverage base is cocoa or coffee in the form of soluble coffee or frozen concentrated or non-concentrated frozen coffee liquor. The separate distinct portions of milk concentrates and flavored beverage base are preferably generated by layering the portions onto one another. By having distinct portions of the flavored beverage base and milk, it is possible to generate a product which, upon the addition of a liquid, has a topping of a high degree of whiteness and clear milk taste over a beverage portion which has the flavor of the beverage base. Alternatively, the distinct portions of the product may be provided by coextruding the two portions.

Considerations with regard to preferred embodiments of the invention in connection with the use discussed above are also applicable to the product and visa versa.

For the making of Cappuccino, the frozen concentrated milk has a solid content from about 10 to 50% by weight and the flavored beverage base is frozen concentrated coffee liquor having a solid content from about 15 to 70% by weight.

For the making of one cup of hot beverage one uses for example from 75 to 150 ml or 10 to 30 grams of concentrated milk having a solids content from 20 to 50%. The appropriate amount depends on the desired thickness, taste and texture of the topping.

In addition, a beverage prepared in accordance with this invention may also be used for the making of an airy Cafe-au-lait beverage. This can be obtained if the product is subjected to sufficient mixing or stirring, thus distributing the aeration and milk throughout the beverage.

It has been found that for certain applications it is advantageous to arrange the flavored beverage base and frozen milk concentrate on a handle. The handle conveniently extends into the product and is preferably a rigid member such as a stick or a spoon. The advantage of the handle is that the preparation of the beverage can be done without use of an additional spoon other than the one provided with the product. Furthermore, the use of a handle may ease demolding and transport of the product during production and packaging.

The invention also relates to a package comprising a portion of flavored beverage base and a portion of a frozen concentrated milk, where the frozen milk incorporates gas at an overrun of at least 150%. The portions of base and milk provide a flavored beverage having a foamed milk topping upon addition of a liquid and thawing of the milk.

Conveniently, this package comprises a first compartment that includes the flavored beverage base portion and a second compartment that contains the frozen concentrated milk portion. In a special version of this embodiment, the package is in the form of a cup comprising sufficient amounts of flavored beverage base and frozen concentrated milk for one serving, with the cup being adapted to receive sufficient liquid for reconstitution and the making of the beverage. This is a favorable way of distributing the product. As for the preparation of the product, the consumer only needs to add a liquid such as water or milk of the desired temperature.

Finally, the invention also relates to a method for providing a hot beverage with a foamed topping. This method comprises the steps of: providing concentrated milk; freezing the concentrated milk concentrates; incorporating gas into an overrun of at least 150%, preferably 200 to 250%; and adding a liquid with heating if necessary to make a hot beverage with a foamed topping. Considerations as to preferred ways of carrying out this method were described previously.

EXAMPLES

The following examples are provided as illustrations of preferred products and formulations of this invention. All parts are given by weight unless otherwise noted.

Example 1

A concentrated skimmed milk is advantageously frozen by using twin-screw freezing to form a topping component.

The skimmed milk is pasteurized and then introduced at 25° C. into an evaporator where it is concentrated to 30% dry matter. This concentrate is introduced into a twin-screw extruder, the barrel of which has nine 100 mm long segments F1 to F9 with which are associated individual cooling circuits through which a water-alcohol mixture passes. It is possible to introduce air from either side of the barrel by means of a piston provided with a mass flow meter.

The operating conditions are given below:

Configuration of screws 1 and 2

| Segments | F1 | F2 | F3 | F4 | F5 | F6–F7 | F8–F9 |
|---|---|---|---|---|---|---|---|
| Type of screw | T | T | T | M/C | T | CO | CO |

Where T: Transport, M: Mixing, C: Shear and CO: Compression

Without air injection.

Flow rate/temperature of concentrate: 10 kg/h in F1/5° C.

Rate of rotation of screws: 400 rpm.

Diameter of die (without outlet pipe or valve): 1.2 mm

Temperature in the barrel segments and die plate:

| Segments | F1–F2 | F3 | F4–F9 | plate |
|---|---|---|---|---|
| Temperature (° C.) | +3 to +5 | T | −10 to −11 | −8 to −10 |

The temperature of the mass on emerging from the die is −9° C.

The product obtained has an oily and creamy texture, which is not the case when the same concentrate is treated in a conventional freezer. This product shows good stability on freezing with a minimum of retraction in area. Its behavior on thawing is also different and it melts much more slowly. It produces a much colder sensation in the mouth. The frozen concentrate is perfectly homogeneous, without solid/liquid phase separations, and can be stored without adverse changes at −18° C. When solidified at −18° C. and brought to room temperature, the frozen concentrate retained its shape for at least 30 minutes, whereas the same product treated in a conventional freezer became entirely liquid in less than 15 minutes. Moreover, the product was stable to temperature variations.

Example 2

Milk/Coffee tablets are prepared as follows:

A concentrate of coffee solids is prepared of reconstituted soluble coffee. This is deposited in the bottom of a plastic cup and stored under freezing conditions.

Concentrated whole milk is frozen in a twin screw freezer in the manner described in Example 1. A portion of the frozen aerated concentrated milk is compacted or arranged in a particular pattern on top of the frozen coffee concentrate to form a tablet having a layer of coffee and a layer of concentrated milk. The overrun of the product is in the range of from 200 to 250%.

The tablets that are formed contain:

3 to 7% coffee solids 15 to 30% milk solids 3 to 7% sugar 60 to 65% water

Similarly, tablets are prepared with a coffee portion of coffee liquor having a solids content of 10 to 20% by weight. The coffee liquor is then frozen. Beverages can then be prepared from the tablets by the addition of heated water or milk.

Example 3

A cup of Cappuccino is made using a tablet having a concentrated milk part and a flavor beverage base.

FIG. 1B illustrates this tablet 10 positioned in a cup 7. The tablet has an upper layer of frozen concentrated milk 1 and a bottom layer of frozen flavor beverage base 2.

A frozen 35-gram tablet prepared as described in example 2 is e.g. used. It comprises 2 gram coffee solids, 10 gram milk solids, 20 gram water and 1.5 gram of sugar.

The tablet is positioned in a cup 7 and water 4 is added. A suitable amount is 100 ml as illustrated by FIG. 1A. The tablet and the water are then heated in a microwave oven and a Cappuccino beverage is generated as shown in FIG. 1C. The Cappuccino is examined; it has a distinct lower coffee beverage part 6 covered with a white milk foam layer 5.

The cup 7 may be the package in which the aerated frozen concentrated milk is sold. The concentrated milk may be with or without the flavored beverage base. If the product is sold in a cup package, the consumer can prepare the product by simply adding an appropriate liquid to the cup and perform any necessary heating. In an alternative version, not shown in the drawings, the package has two compartments: one for the concentrated milk and one for the flavored beverage base. This allows the consumer to adjust the taste of the beverage by varying the amount added of the beverage base.

Example 4

A coffee beverage being prepared in a manner similar to that described in Example 3. Here, however, the coffee liquor 2 at the bottom of the cup is replaced by soluble coffee portions 3, as shown in FIG. 2B. Again, the amount of water is as shown in FIG. 2A and the resulting beverage is shown in FIG. 2C, where the coffee beverage part 6 is covered with a white milk foam layer 5.

Example 5

A concentrate of coffee solids 2 made of coffee liquor having a solid content of 10 to 40% by weight is illustrated in FIG. 3B. The coffee concentrate 2 is co-extruded with the frozen aerated concentrated milk 1, as shown in the cross-sectional depiction of FIG. 4.

A coffee product is prepared as discussed in Example 4. The beverage having a coffee beverage part 6 and a foamed milk topping 5 is generated, as shown in FIG. 3C using an amount of water as shown in FIG. 3A.

If desired, the product can be made into an airy café-au-lait type of product by stirring the contents so as to distribute the foam 5 throughout the beverage part 6.

What is claimed is:

1. A product comprising a beverage-forming component and a frozen milk concentrate component, wherein the frozen milk concentrate component incorporates a gas therein at an overrun of at least 150%, with the components constituting distinct separate portions of the product and being present in amounts sufficient to form a beverage having a foamed milk topping thereon after addition of a liquid to the product and melting of the frozen milk concentrate component.

2. The product of claim 1 wherein the beverage-forming component is cocoa or coffee with the coffee being in the form of soluble coffee or a frozen coffee liquor.

3. The product of claim 1 wherein the distinct portions of the components are present in layers.

4. The product of claim 1 wherein the gas is oxygen, nitrogen, carbon dioxide, air and other mixtures thereof, and the milk concentrate component is frozen and aerated to an overrun from about 200 to 250%.

5. The product of claim 1 wherein the milk concentrate component has a solids content from about 10 to 50% by weight and the beverage forming-component is frozen concentrated coffee liquor having a solids content from about 15 to 70% by weight.

6. The product of claim 1 wherein the milk concentrate component is present in an amount of about 10 to 35 grams.

7. The product of claim 1 which further comprises a handle for supporting the beverage-forming component and milk concentrate.

8. A package comprising a beverage-forming component and a frozen milk concentrate component, with the frozen milk concentrate component incorporating a gas at an overrun of at least 150%, and the components being present in amounts sufficient to form a beverage having a foamed milk topping thereon after addition of a liquid thereto and melting of the frozen milk concentrate component.

9. The package of claim 8 comprising a first compartment for the beverage-forming component and a second compartment for the frozen milk concentrate component.

10. The package of claim 8 in the form of a cup wherein the beverage-forming component and frozen milk concentrate component are present in amounts sufficient for one serving, with the cup being adapted to receive and retain liquid for forming the beverage.

11. A method of preparing a beverage having foamed milk-based topping which comprises: preparing a frozen concentrated milk having an overrun of at least 150%, and combining a liquid with the frozen concentrated milk to form the beverage.

12. The method of claim 11 which further comprises including a beverage-forming component in the liquid before the beverage is formed.

13. The method of claim 12 which further comprises selecting the beverage-forming component to be a coffee, cocoa, or chocolate-based component or a mixture thereof.

14. The method of claim 11 which further comprises associating the frozen concentrated milk with a beverage-forming component before adding the liquid thereto.

15. The method of claim 14, which further comprises selecting the beverage-forming component to be a coffee, cocoa, or chocolate-based component or a mixture thereof.

16. The method of claim 14 further comprises co-extruding the beverage-forming component and frozen concentrated milk before combining with the liquid.

17. The method of claim 11 which further comprises heating the liquid to a temperature of at least about 40° C. before the beverage is formed.

18. The method of claim 11 which further comprises selecting the liquid to be water, milk or a mixture thereof.

19. The method of claim 11 which further comprises forming the frozen concentrated milk by concentrating and freezing milk in a twin screw freezer to form a frozen concentrated milk having a solids content of about 10 to 50% by weight.

20. The method of claim 11, which further comprises preparing a topping base that includes the frozen concentrated milk therein before the frozen concentrated milk is combined with the liquid to form the beverage, with the frozen concentrated milk constituting at least about 95% by weight of the topping base.

* * * * *